C. B. VERONEE.
Sewing-Machine Fan-Attachments.
No. 135,868.            Patented Feb. 11, 1873.
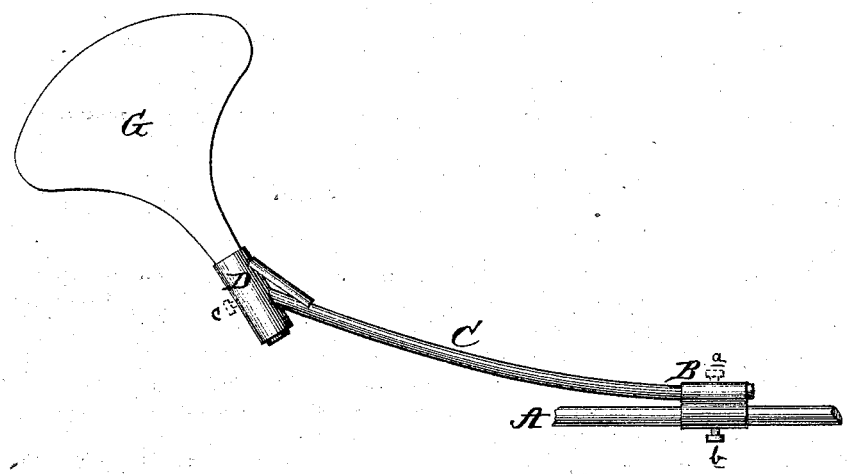
Witnesses
John A. Ellis
Wm. K. Ellis
Inventor
Cornelius B. Veronee
Per
J. H. Alexander & Co.
Attys.

UNITED STATES PATENT OFFICE.

CORNELIOUS B. VERONEE, OF ATHENS, GEORGIA.

IMPROVEMENT IN SEWING-MACHINE FAN ATTACHMENTS.

Specification forming part of Letters Patent No. 135,868, dated February 11, 1873.

*To all whom it may concern:*

Be it known that I, CORNELIOUS B. VERONEE, of Athens, in the county of Clarke and State of Georgia, have invented certain new and useful Improvements in Fan Attachment for Sewing-Machines; and I do hereby declare that the following is a full, clear, and exact description thereof, reference being had to the accompanying drawing and to the letters of reference marked thereon which form a part of this specification.

The nature of my invention consists in the construction and arrangement of devices, whereby a fan is attached to a sewing-machine, so as to be adjusted in any desired position, and which shall furnish a device simple in construction, convenient in operation, and durable in use.

In order to enable others skilled in the art to which my invention appertains to make and use the same, I will now describe it, referring to the annexed drawing, with letters of reference marked thereon forming a part of this specification, in which the figure represents a side elevation of a device embodying my invention.

A represents the rocking shaft or needle-bar of a sewing-machine. B represents a socket formed of one piece of metal. This socket is furnished with set-screws $a$ $b$, by which means the inclined arm C is held and adjusted in any desired position upon the rocking shaft A. The inclined arm C is furnished at one end with a socket, D, having a set-screw, $c$, which clamps the stem of the fan G, which fits in the socket D, by which means the fan may be raised or lowered or turned in any direction.

It will be observed that by means of the double socket B and the set-screws, the inclined arm C, and the socket D with the adjustable fan, the fan may be adjusted to any position whatever.

I am aware that fans have been used in various positions upon sewing-machines, and I do not therefore claim broadly such device; but

Having thus fully described my invention, what I do claim, and desire to secure by Letters Patent, is—

The inclined or bent arm C, rocking bar A, double socket B with set-screws $a$ $b$, socket D with set-screw $c$, and fan G, the several parts being constructed and arranged as herein set forth.

In testimony that I claim the foregoing as my own I affix my signature in presence of two witnesses.

CORNELIOUS B. VERONEE.

Witnesses:
 W. D. CHRISTY,
 J. R. MOORE.